(12) United States Patent
Khawer et al.

(10) Patent No.: US 10,104,692 B2
(45) Date of Patent: Oct. 16, 2018

(54) ADAPTIVE ENERGY DETECTION THRESHOLD FOR CLEAR CHANNEL ASSESSMENT

(71) Applicant: Alcatel-Lucent, Boulogne-Billancourt (FR)

(72) Inventors: Mohammad Khawer, Lake Hopatcong, NJ (US); David Lopez-Perez, Blanchardstown (IE); Jonathan Ling, North Brunswick, NJ (US)

(73) Assignee: Nokia Technologies Oy, Espoo (FI)

( * ) Notice: Subject to any disclaimer, the term of this patent is extended or adjusted under 35 U.S.C. 154(b) by 166 days.

(21) Appl. No.: 15/173,096

(22) Filed: Jun. 3, 2016

(65) Prior Publication Data

US 2017/0353975 A1 Dec. 7, 2017

(51) Int. Cl.
*H04W 74/08* (2009.01)
*H04W 8/00* (2009.01)
*H04B 17/318* (2015.01)

(52) U.S. Cl.
CPC ...... *H04W 74/0816* (2013.01); *H04B 17/318* (2015.01); *H04W 8/005* (2013.01)

(58) Field of Classification Search
CPC . H04W 74/0816; H04W 8/005; H04B 17/318
See application file for complete search history.

(56) References Cited

U.S. PATENT DOCUMENTS

| | | | | |
|---|---|---|---|---|
| 9,673,921 B1 * | 6/2017 | Jakoby | | H04B 17/318 |
| 2016/0143014 A1 * | 5/2016 | Mukherjee | | H04W 74/0816 |
| | | | | 370/330 |
| 2016/0173361 A1 * | 6/2016 | Somasundaram | | H04L 43/16 |
| | | | | 370/328 |
| 2017/0142751 A1 * | 5/2017 | Liu | | H04L 5/1415 |
| 2017/0223676 A1 * | 8/2017 | Dinan | | H04L 1/1887 |
| 2017/0325225 A1 * | 11/2017 | Dinan | | H04W 72/0446 |
| 2017/0353972 A1 * | 12/2017 | Babaei | | H04W 72/14 |

OTHER PUBLICATIONS

"Part 11: Wireless LAN Medium Access Control (MAC) and Physical Layer (PHY) Specifications, Amendment 4: Enhancements for Very High Throughput for Operation in Bands Below 6 GHz," IEEE Standard for Information Technology, IEEE Std. 802.11ac-2013, Dec. 11, 2013, 425 pages.

"Part 11: Wireless LAN Medium Access Control (MAC) and Physical Layer (PHY) Specifications, Amendment 5: Enhancements for Higher Throughput" IEEE Standard for Information Technology, IEEE Std. 802.11n-2009, Sep. 11, 2009, 536 pages.

"3RD Generation Partnership Project; Technical Specification Group Radio Access Network; Study on Licensed-Assisted Access to Unlicensed Spectrum (Release 13)," 3GPP TR 36.889 V13.0.0, Jun. 2015, 74 pages.

LTE-U Forum, "LTE-U SDL Coexistence Specifications," V1.3, Oct. 2015, 12 pages.

* cited by examiner

*Primary Examiner* — Hashim S Bhatti (57) ABSTRACT

A first node includes a transceiver configured to detect one or more second nodes that transmit one or more signals on a channel of an unlicensed frequency band. The one or more signals have one or more received signal strengths at the first node that are below an energy detection threshold that indicates the channel is clear for transmission by the first node. The first node also includes a processor configured to modify the energy detection threshold based on the received signal strength.

20 Claims, 6 Drawing Sheets

ADAPTIVE ENERGY DETECTION THRESHOLD FOR CLEAR CHANNEL ASSESSMENT

BACKGROUND

Field of the Disclosure

The present disclosure relates generally to wireless communication systems and, more particularly, to clear channel assessment in wireless communication systems.

Description of the Related Art

Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 gigahertz (GHz) to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 megahertz (MHz), a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider.

Wireless communication devices that transmit or receive signals in licensed or unlicensed frequency bands are typically referred to as nodes, which may include Wi-Fi access points that operate according to IEEE 802.11 standards in the unlicensed spectrum. Nodes also include base stations that operate in the licensed spectrum according to standards such as Long Term Evolution (LTE) standards defined by the Third Generation Partnership Project (3GPP). Base stations that operate according to LTE can implement supplementary downlink (SDL) channels in the unlicensed spectrum to provide additional bandwidth for downlink communications to user equipment that are also communicating with the base station using channels in a licensed frequency band. The licensed frequency bands may be referred to as LTE-L bands and the unlicensed frequency bands may be referred to as LTE-U bands. Base stations may also operate in the unlicensed frequency bands according to Licensed Assisted Access (LAA) standards. Base stations may operate solely in the unlicensed frequency bands without support in licensed frequency bands, e.g., according to emerging standards such as MuLTEFire.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

In dense networks, channels in the unlicensed frequency bands may be reused by nodes that operate according to different radio access technologies (RATs) such as Wi-Fi access points and LTE base stations. Communication by the nodes that operate according to the different RATs is coordinated using clear channel assessment techniques to reduce interference between transmissions by the different nodes. For example, listen before talk (LBT) coexistence rules require that each node monitors a channel (e.g., "listens") to detect energy on the channel prior to transmitting information on the channel. If the detected energy level is below a threshold level, the channel is considered clear and the node is free to transmit on the channel for a predetermined time interval. If the detected energy level is above the threshold level, which indicates that the channel is not clear because another node is transmitting on the channel, the listening node backs off until the energy level falls below the threshold before making another attempt to acquire the channel. The energy detection threshold for Wi-Fi is −62 decibel-milliwatts (dBm) and the energy detection threshold for LTE-U, LAA is −72 dBm, and MuLTEFire is −72 dBm. Wi-Fi nodes may also perform Wi-Fi preamble decoding on signals with detected energy levels below the energy detection threshold and above −82 dBm. The Wi-Fi node backs off if it successfully decodes preambles in transmissions by other Wi-Fi nodes at an energy level between −62 dBm and −82 dBm.

Signals transmitted according to LTE-U, LAA, or MuLTEFire in the unlicensed frequency band do not use the same frame structure as signals transmitted according to Wi-Fi. The Wi-Fi node is therefore not able to identify interfering LTE-U, LAA or MuLTEFire transmissions at energy levels below −62 dBm and does not back off in the presence of such transmissions. Similarly, nodes that operate according to LTE-U or LAA are not able to identify Wi-Fi transmissions at energy levels below −72 dBm. The LTE-U, LAA, and MuLTEFire nodes therefore do not back off in the presence of such transmissions. Similarly, nodes that are owned or operated by different operators may not back off in response to detecting each other's signals at strengths below −72 dBm. Consequently, transmissions by Wi-Fi nodes, LTE-U nodes, LAA nodes, and MuLTEFire nodes on channels of the unlicensed frequency bands are likely to interfere with transmissions by other nodes on the same channels at energy levels between −62 dBm and −82 dBm.

This interference increases error rates at the receiving nodes, which causes the node to reduce its transmission rate and its throughput.

Coexistence of nodes that operate according to different RATs can be enhanced if each (first) node that operates according to a first RAT modifies the energy detection threshold used to acquire a channel in an unlicensed frequency band in response to detecting one or more (second) nodes that operate according to a second RAT. The second nodes transmit signals received by the first node at a signal strength below the energy detection threshold. Modification of the energy detection threshold may include reducing the energy detection threshold to a value that corresponds to a received signal strength of signals transmitted by the second nodes or to a minimum value such as −82 dBm. The second nodes may be detected by the first node based on pseudo-beacons transmitted by the second nodes according to the first RAT. For example, the first node may decode a pseudo-beacon transmitted by a second node and use the decoded beacon to determine a received signal strength for signals transmitted by the second node according to the second RAT. The second nodes may also be detected based on temporal characteristics of signals received by the first node. For example, the first node may detect a signal that does not have a decodable preamble but increases suddenly and maintains a substantially constant signal strength before dropping after a time interval that corresponds to a time interval used for transmissions according to the second RAT. Some embodiments of the first node may also implement modules that are capable of decoding beacon signals, information blocks, or reference signals transmitted by the second nodes. The decoded signals may then be used to detect the presence of the second nodes and estimate the received signal strength for signals transmitted by the second nodes. For example, coexisting nodes from different operators may detect the presence of other nodes by decoding a common LTE overhead signal such as a common reference signal (CRS) transmitted by the other nodes. Nodes operated by different operators may then adjust their energy detection threshold based on the signal strengths indicated by the detected signals to enhance coexistence.

Figure 1:
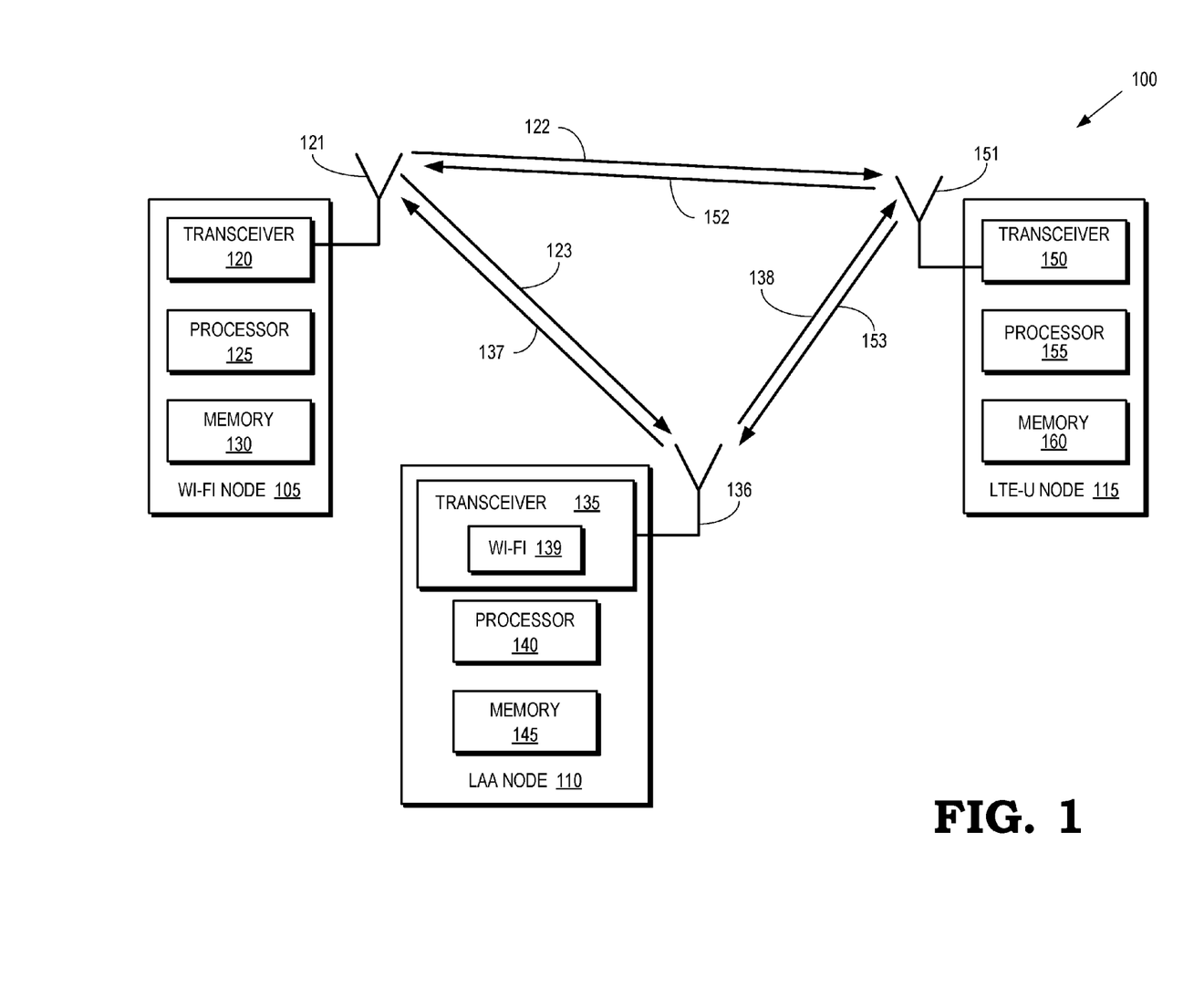
FIG. 1 is a block diagram of a wireless communication system that supports coexistence of nodes that operate according to different radio access technologies (RATs) on a channel or channels of unlicensed frequency bands according to some embodiments.

FIG. 1 is a block diagram of a wireless communication system 100 that supports coexistence of nodes that operate according to different RATs on a channel or channels of unlicensed frequency bands according to some embodiments. The wireless communication system 100 implements a node 105 that operates according to a first RAT such as Wi-Fi. For example, the node 105 may operate according to IEEE Std 802.11ac™-2013 or IEEE Std 802.11n™-2009, which are incorporated herein by reference in their entirety. The wireless communication system 100 also implements a node 110 that operates according to a second RAT such as license assisted access (LAA). For example, the node 110 may operate in the unlicensed frequency bands according to Licensed Assisted Access (LAA) standards such as the 3GPP TR 36.889 V13.0.0 (2015-06)-Study on Licensed Assisted Access to Unlicensed Spectrum (Release 13), which is incorporated herein by reference in its entirety. The wireless communication system 100 further implements a node 115 that operates according to a third RAT such as Long Term Evolution (LTE). For example, the node 115 may operate in the licensed frequency band and the unlicensed frequency band according to the LTE-U SDL Coexistence Specifications v1.3 (2015), which is incorporated herein by reference in its entirety. Although not shown in FIG. 1, the wireless communication system 100 may also include other nodes that operate according to other RATs (such as MuL-TEFire that unlike LAA, and LTE-U does not require an anchor licensed carrier for its operation, and supports stand-alone LTE operation in the unlicensed spectrum). The nodes 105, 110, 115 or any other nodes implemented in the wireless communication system 100 may be owned or operated by different mobile network operators.

The node 105 includes a transceiver 120 for transmitting and receiving signals using one or more antennas 121. The transceiver 120 may be used to transmit beacon signals 122, 123 including preambles that can be decoded by other nodes that operate according to Wi-Fi or nodes that implement Wi-Fi listen modules that are capable of decoding Wi-Fi preambles. In some embodiments, the beacon signals 122, 123 represent a single broadcast signal transmitted by the transceiver 120. The transceiver 120 may be configured to receive beacon signals or pseudo-beacon signals that include decodable preambles, as well as non-beacon signals that do not include preambles that are in a format that is decodable by the node 105. The transceiver 120 is configured to perform clear channel assessment (e.g., according to LBT rules) prior to transmitting signals on channels in the unlicensed frequency band. The transceiver 120 may be implemented as a single integrated circuit (e.g., using a single ASIC or FPGA) or as a system-on-a-chip (SOC) that includes different modules for implementing the functionality of the transceiver 120.

The node 105 also includes a processor 125 and a memory 130. The processor 125 may be used to execute instructions stored in the memory 130 and to store information in the memory 130 such as the results of the executed instructions. Some embodiments of the processor 125 are configured to decode preambles in beacon signals or pseudo-beacon signals received by the transceiver 120. Some embodiments of the processor 125 are also configured to detect the presence of other nodes such as the nodes 110, 115 based on characteristics of signals detected by the transceiver 120. For example, the processor 125 may detect the presence of the nodes 110, 115 based on temporal characteristics of the detected signals such as a rise time, a signal duration, a substantially constant received signal strength for the signal duration, a periodicity, and the like. The processor 125 may also be able to determine received signal strengths for signals received at the node 105 from other nodes such as the nodes 110, 115 based on the received beacon signals, pseudo-beacon signals, or non-beacon signals. This information may be used to set energy detection thresholds used by the node 105 for clear channel assessment, as discussed herein. Some embodiments of the processor 125 implement a timer that is used to measure a detection time interval that is used to determine an energy detection threshold, as discussed herein.

The node 110 includes a transceiver 135 for transmitting and receiving signals using one or more antennas 136. The transceiver 135 may be used to transmit pseudo-beacon signals 137 including preambles that can be decoded by other nodes that operate according to Wi-Fi or nodes that implement Wi-Fi listen modules that are capable of decoding Wi-Fi preambles. The transceiver 135 may also be used to transmit non-beacon signals 138 that include information such as a master information block (MIB) that is received by user equipment (not shown in FIG. 1) and used to gain access to the network. The MIB includes information indicating a downlink channel bandwidth in terms of resource blocks, configuration information for a physical hybrid automatic repeat request (HARQ) indicator channel (PHICH), and a system frame number. The non-beacon information may also include system information blocks (SIBs)

that are used to transmit additional information for configuring user equipment. The non-beacon information may further include reference signals such as common reference signals (CRSs) that are transmitted in resource blocks to facilitate coherent demodulation of signals.

The transceiver 135 is configured to receive beacon signals (such as the signal 123), pseudo-beacon signals, or non-beacon signals. As used herein, the term "pseudo-beacon" refers to a signal such as a preamble that is generated and transmitted by a non-Wi-Fi transceiver in a format that is understandable (e.g., decodable) by a Wi-Fi node and may be processed by the Wi-Fi node as if it was a beacon signal or a preamble of a beacon signal. Some embodiments of the transceiver 135 include a Wi-Fi listen module 139 that is capable of decoding preambles in beacon signals transmitted by Wi-Fi nodes such as the beacon signal 123 transmitted by the node 105. Although the Wi-Fi listen module 139 is considered an integral part of the transceiver 135 in the embodiment illustrated in FIG. 1, some embodiments of the node 110 implement the Wi-Fi listen module 139 as a separate radiofrequency module. The transceiver 135 is also configured to perform clear channel assessment (e.g., according to LBT rules or precursor rules that are similar to or consistent with LBT rules) prior to transmitting signals on channels in the unlicensed frequency band. The transceiver 135 may be implemented as a single integrated circuit (e.g., using a single ASIC or FPGA) or as a system-on-a-chip (SOC) that includes different modules for implementing the functionality of the transceiver 135.

The node 110 also includes a processor 140 and a memory 145. The processor 140 may be used to execute instructions stored in the memory 145 and to store information in the memory 145 such as the results of the executed instructions. Some embodiments of the processor 140 are configured to detect the presence of other nodes, such as the node 115, based on signals including information such as an MIB, SIB, or CRS. Some embodiments of the processor 140 are configured to decode preambles in beacon signals or pseudo-beacon signals received by the transceiver 135 or received decoded preambles from the Wi-Fi listen module 139. Some embodiments of the processor 140 are also configured to detect the presence of other nodes such as the nodes 105, 115 based on characteristics of signals detected by the transceiver 135. For example, the processor 140 may detect the presence of the nodes 110, 115 based on temporal characteristics of the detected signals such as a rise time, a signal duration, a substantially constant received signal strength for the signal duration, a periodicity, and the like. The information used to detect the presence of the nodes 105, 115 may be used to set energy detection thresholds used by the node 110 for clear channel assessment, as discussed herein. Some embodiments of the processor 140 implement a timer that is used to measure a detection time interval that is used to determine an energy detection threshold, as discussed herein.

The node 115 includes a transceiver 150 for transmitting and receiving signals using one or more antennas 151. The transceiver 150 may be used to transmit pseudo-beacon signals 152 including preambles that can be decoded by other nodes that operate according to Wi-Fi or nodes that implement Wi-Fi listen modules that are capable of decoding Wi-Fi preambles. The transceiver 150 may also be used to transmit non-beacon signals 153 that include information such as an MIB, an SIB, or a CRS. The transceiver 150 is configured to receive beacon signals (such as the signal 122), pseudo-beacon signals, or non-beacon signals (such as the signal 138). Although the Wi-Fi listen module is considered an integral part of the transceiver 150 in the embodiment illustrated in FIG. 1, some embodiments of the node 115 implement the Wi-Fi listen module as a separate radiofrequency module. Some embodiments of the transceiver 150 in the LTE-U node 115 are configured implement a carrier sense adaptive transmission (CSAT) duty cycle mechanism for transmissions in the unlicensed frequency band. The transceiver 150 may be implemented as a single integrated circuit (e.g., using a single ASIC or FPGA) or as a system-on-a-chip (SOC) that includes different modules for implementing the functionality of the transceiver 150.

The node 115 also includes a processor 155 and a memory 160. The processor 155 may be used to execute instructions stored in the memory 160 and to store information in the memory 160 such as the results of the executed instructions. Some embodiments of the processor 155 are configured to detect the presence of other nodes, such as the node 110, based on signals including information such as an MIB, SIB, or CRS. Some embodiments of the processor 155 are also configured to detect the presence of other nodes such as the nodes 105, 110 based on characteristics of signals detected by the transceiver 150. For example, the processor 155 may detect the presence of the nodes 105, 110 based on temporal characteristics of the detected signals such as a rise time, a signal duration, a substantially constant received signal strength for the signal duration, a periodicity, and the like. The information used to detect the presence of the nodes 105, 110 may be used to set energy detection thresholds used by the node 115 for clear channel assessment, as discussed herein. Some embodiments of the processor 155 implement a timer that is used to measure a detection time interval that is used to determine an energy detection threshold, as discussed herein.

The nodes 105, 110, 115 perform clear channel assessment before transmitting on channels of the unlicensed frequency band based on energy detection thresholds. For example, the node 105 may initially perform clear channel assessment based on an energy detection threshold of −62 dBm and the nodes 110, 115 may initially perform clear channel assessment based on an energy detection threshold of −72 dBm. Some embodiments of the nodes 105, 110, 115 dynamically modify their energy detection thresholds in response to detecting the presence of one or more nodes transmitting signals that are received at the nodes 105, 110, 115 with a received signal strength that differs from the current energy detection threshold. For example, the node 105 may detect the node 110 or the node 115 by detecting a beacon signal, a pseudo-beacon signal, or a non-beacon signal. The node 105 may then determine a received signal strength for signals received on a channel of the unlicensed frequency band based on the detected signal. The received signal strength may be substantially equal to the signal strength of the received signal used to detect the other node or the received signal strength may be determined based on information included in the detection signal, such as a decoded preamble. The node 105 may then modify its current energy detection threshold based on the received signal strength.

Figure 2:
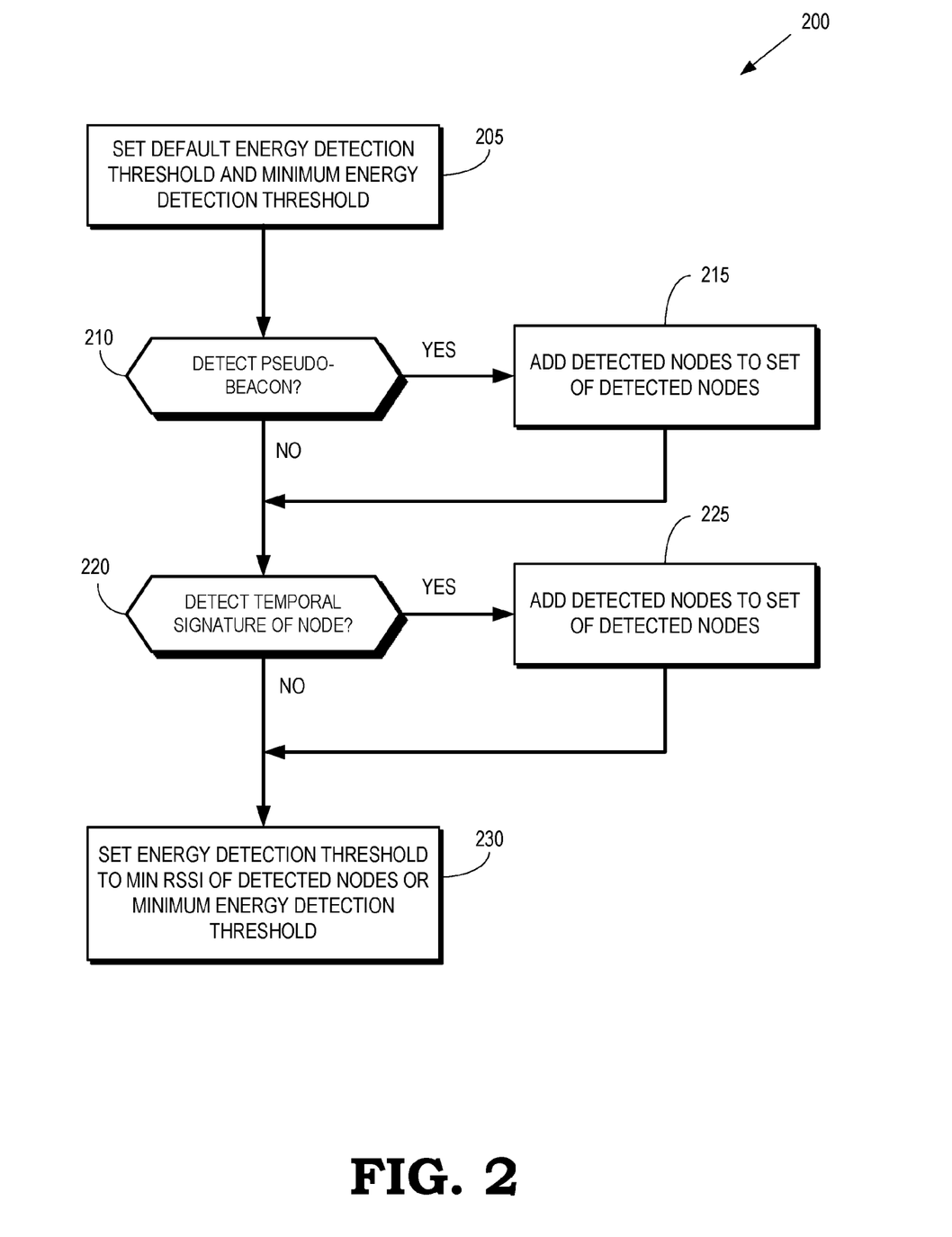
FIG. 2 is a flow diagram of a method of determining an energy detection threshold for a Wi-Fi node according to some embodiments.

FIG. 2 is a flow diagram of a method 200 of determining an energy detection threshold for a Wi-Fi node according to some embodiments. The method 200 may be implemented in some embodiments of the node 105 shown in FIG. 1. The Wi-Fi node has a minimum energy detection threshold that may be derived using simulations, empirical performance results, and the like. For example, the minimum energy detection threshold may be set to a value that is 10 dBm lower than default energy detection threshold used for clear channel assessment. In the case of Wi-Fi, the minimum energy detection threshold may therefore be set to −72 dBm. The Wi-Fi node uses embodiments of the method 200 to set the energy detection threshold when the Wi-Fi node has detected the presence of one or more other nodes that can transmit on a channel of the unlicensed frequency band used by the Wi-Fi node. The method 200 may therefore be performed in response to detecting the presence of one or more other nodes.

At block 205, the Wi-Fi node sets the energy detection threshold for clear channel assessment to a default value such as −62 dBm. The Wi-Fi node also sets the minimum energy detection threshold for clear channel assessment to a predetermined value such as −72 dBm. The Wi-Fi node may then begin monitoring signals to determine whether to modify the energy detection threshold.

At decision block 210, the Wi-Fi node determines whether a pseudo-beacon has been detected in signals received from the one or more other nodes that can transmit on the channel of the unlicensed frequency band. For example, the Wi-Fi node may determine whether a pseudo-beacon transmitted by nodes such as the nodes 110, 115 shown in FIG. 1 have been detected. If so, the detected nodes are added to a set of detected nodes associated with the Wi-Fi node at block 215. Adding a node to the set of detected nodes includes recording a received signal strength (or a received signal strength indicator, RSSI) for the detected signal from the node. In some embodiments, the received signal strength may be averaged using a filter to mitigate fast fading effects and smooth the measurements of the received signal strength, e.g., over a smoothing time interval. The power of the received pseudo-beacon may differ from the power of the signals transmitted by the detected nodes on the channel of the unlicensed frequency band. The pseudo-beacon signals transmitted by the nodes may therefore include a power factor field that indicates the power (or received signal strength) of the signals transmitted in the unlicensed frequency band relative to the power (or received signal strength) of the pseudo-beacon. The method 200 then flows to decision block 220. If no pseudo-beacon signals are detected, the method 200 flows from decision block 210 to decision block 220.

At decision block 220, the Wi-Fi node determines whether a non-beacon signal has been detected in signals received from the one or more other nodes that can transmit on the channel of the unlicensed frequency band. Some embodiments of the Wi-Fi node detect the presence of a node that is transmitting non-beacon signals based on temporal characteristics of the non-beacon signals. For example, the Wi-Fi node may determine whether a non-beacon signal transmitted by nodes such as the nodes 110, 115 shown in FIG. 1 has been detected by scanning the channel of the unlicensed frequency band and detecting a large increase in a received signal strength followed by a drop in the received signal strength after a time interval that is associated with transmissions in the unlicensed frequency band. Nodes that operate according to different coexistence rules are allowed to transmit in the unlicensed frequency bands for different time intervals, e.g., 4 milliseconds (ms) or 10 ms. Detecting an increase in the received signal strength that persists for such a time interval may therefore indicate the presence of another node transmitting on the channel of the unlicensed frequency band. If the Wi-Fi node detects the presence of one or other nodes transmitting on the channel of the unlicensed frequency band, the detected nodes are added to a set of detected nodes associated with the Wi-Fi node at block 225. Adding a node to the set of detected nodes includes recording a received signal strength (or a received signal strength indicator, RSSI) for the detected signal from the node. The method 200 then flows to block 230. If no other nodes are detected based on received pseudo-beacon signals, the method 200 flows from decision block 220 to block 230.

At block 230, the Wi-Fi node may set its energy detection threshold to the larger of the minimum received signal strength for the set of detected nodes and the minimum energy detection threshold set in block 205. For example, if the minimum received signal strength for the set of detected nodes is between the default energy detection threshold (e.g., −62 dBm) and the minimum energy detection threshold (e.g., −72 dBm), the Wi-Fi node may modify its energy detection threshold to be equal to the minimum received signal strength. For another example, if the minimum received signal strength for the set of detected nodes is below the minimum energy detection threshold, the node may modify its energy detection threshold to be equal to the minimum energy detection threshold. In some cases, the energy detection threshold may be set to the minimum received signal strength (or minimum energy detection threshold) plus or minus a predetermined offset. The Wi-Fi node may then monitor the channel to detect the presence of other nodes on the basis of the modified energy detection threshold.

Figure 3:
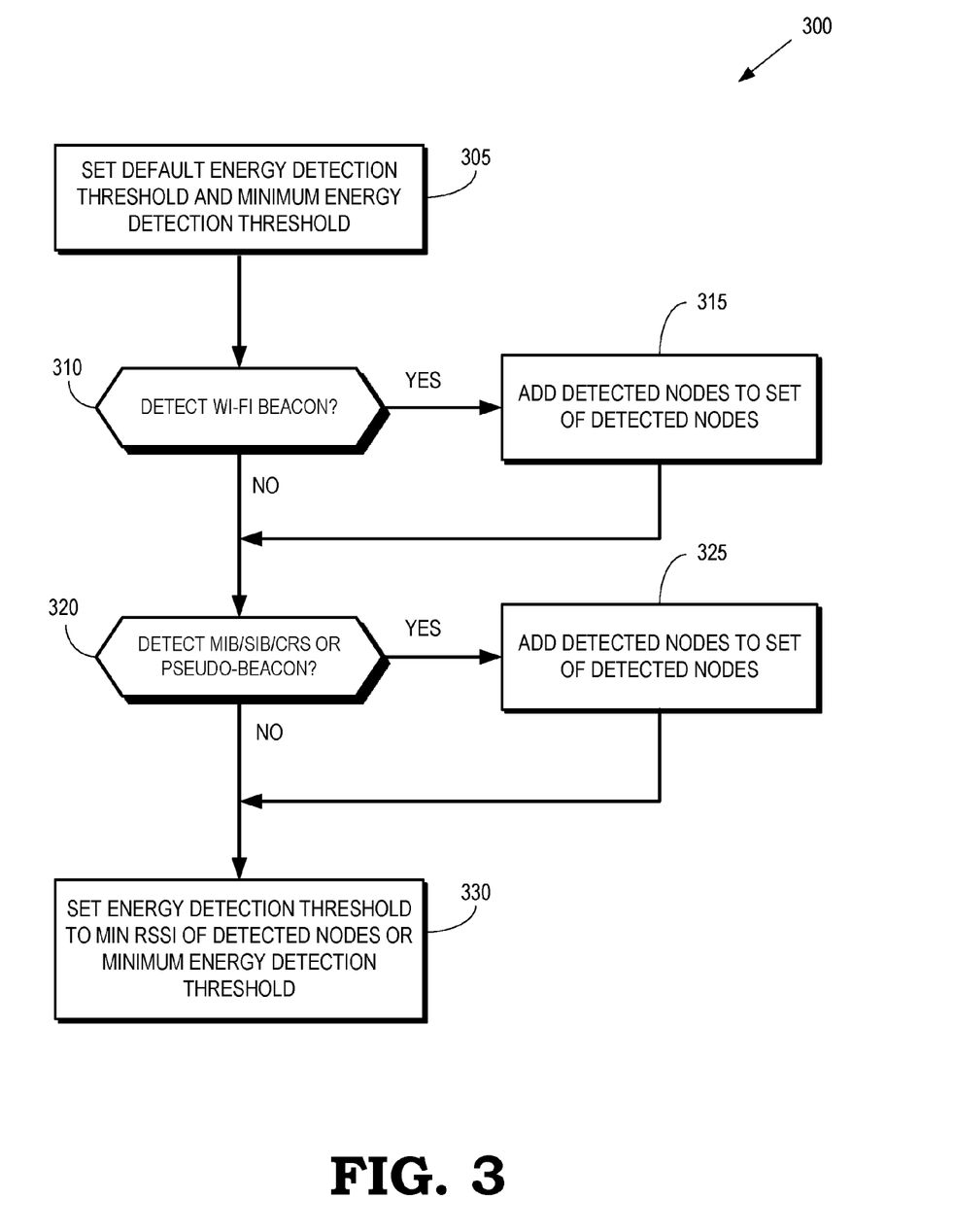
FIG. 3 is a flow diagram of a method of determining an energy detection threshold for a node that operates according to a non-Wi-Fi technology such as LTE-U, LAA, or MuLTEFire according to some embodiments.

FIG. 3 is a flow diagram of a method 300 of determining an energy detection threshold for a node that operates according to a non-Wi-Fi technology such as LTE, LAA, or MuLTEFire according to some embodiments. The method 300 may be implemented in some embodiments of the node 110 or the node 115 shown in FIG. 1. The node has a minimum energy detection threshold that may be derived using simulations, empirical performance results, and the like. For example, the minimum energy detection threshold may be set to a value that is lower than default energy detection threshold used for clear channel assessment. In the case of LTE, LAA, or MuLTEFire, the minimum energy detection threshold may be set to −80 dBm. The node uses embodiments of the method 300 to set the energy detection threshold when the node has detected the presence of one or more other nodes that can transmit on a channel of the unlicensed frequency band used by the node. The method 300 may therefore be performed in response to detecting the presence of one or more other nodes.

At block 305, the node sets the energy detection threshold for clear channel assessment to a default value such as −72 dBm. The node also sets the minimum energy detection threshold for clear channel assessment to a predetermined value such as −80 dBm. The node may then begin monitoring signals to determine whether to modify the energy detection threshold.

The decision block 310 may be performed by the node if the node includes a Wi-Fi listen module such as the Wi-Fi listen module 139 in the node 110 shown in FIG. 1. Nodes that do not include a Wi-Fi listen module (such as the node 115 shown in FIG. 1) bypass the decision block 310 and the method 300 flows to the decision block 320. At decision block 310, the node determines whether a Wi-Fi beacon has been detected in signals received from the one or more other nodes that can transmit on the channel of the unlicensed frequency band. If so, the detected nodes are added to a set of detected nodes associated with the node at block 315. Adding a node to the set of detected nodes includes recording a received signal strength (or a received signal strength indicator, RSSI) for the detected signal from the node. In some embodiments, the received signal strength may be averaged using a filter to mitigate fast fading effects and smooth the measurements of the received signal strength, e.g., over a smoothing time interval. The power of the received Wi-Fi beacon may differ from the power of the signals transmitted by the detected nodes on the channel of the unlicensed frequency band. The Wi-Fi beacon signals transmitted by the nodes may therefore include a power factor field that indicates the power (or received signal strength) of the signals transmitted in the unlicensed frequency band relative to the power (or received signal strength) of the Wi-Fi beacon. The method 300 then flows to decision block 320. If no Wi-Fi beacon signals are detected, the method 300 flows from decision block 310 to decision block 320.

At decision block 320, the node scans channels in the unlicensed frequency band during an OFF time interval in which the node does not transmit on the channel of the unlicensed frequency band. During the OFF time interval, the node attempts to decode signals received from other non-Wi-Fi nodes that operate according to the same RAT as the node or different RAT. Some embodiments of the node may detect and decode signals including MIB, SIB, CRS, or pseudo-beacon signals transmitted by the non-Wi-Fi nodes. If the node detects the presence of one or more non-Wi-Fi nodes transmitting on the channel of the unlicensed frequency band, the detected non-Wi-Fi nodes are added to a set of detected nodes associated with the node at block 325. Adding a non-Wi-Fi node to the set of detected nodes includes recording a received signal strength (or a received signal strength indicator, RSSI) that is determined based on the detected signal from the non-Wi-Fi node. The method 300 then flows to block 330. If no non-Wi-Fi nodes are detected, the method 300 flows from decision block 320 to decision block 330.

At block 330, the node may set its energy detection threshold to the larger of the minimum received signal strength for the set of detected nodes and the minimum energy detection threshold set in block 305. In some embodiments, the node adds a margin to the energy detection threshold to reduce the probability of missed detections while maintaining an acceptable false alarm probability. For example, if the minimum received signal strength for the set of detected nodes is between the default energy detection threshold (e.g., −72 dBm) and the minimum energy detection threshold (e.g., −80 dBm), the node may modify its energy detection threshold to be equal to the minimum received signal strength. For another example, if the minimum received signal strength for the set of detected nodes is below the minimum energy detection threshold, the node may modify its energy detection threshold to be equal to the minimum energy detection threshold. In some cases, the energy detection threshold may be set to the minimum received signal strength (or minimum energy detection threshold) plus or minus a predetermined offset. The node may then monitor the channel to detect the presence of other nodes, e.g., on the basis of the modified energy detection threshold.

Figure 4:
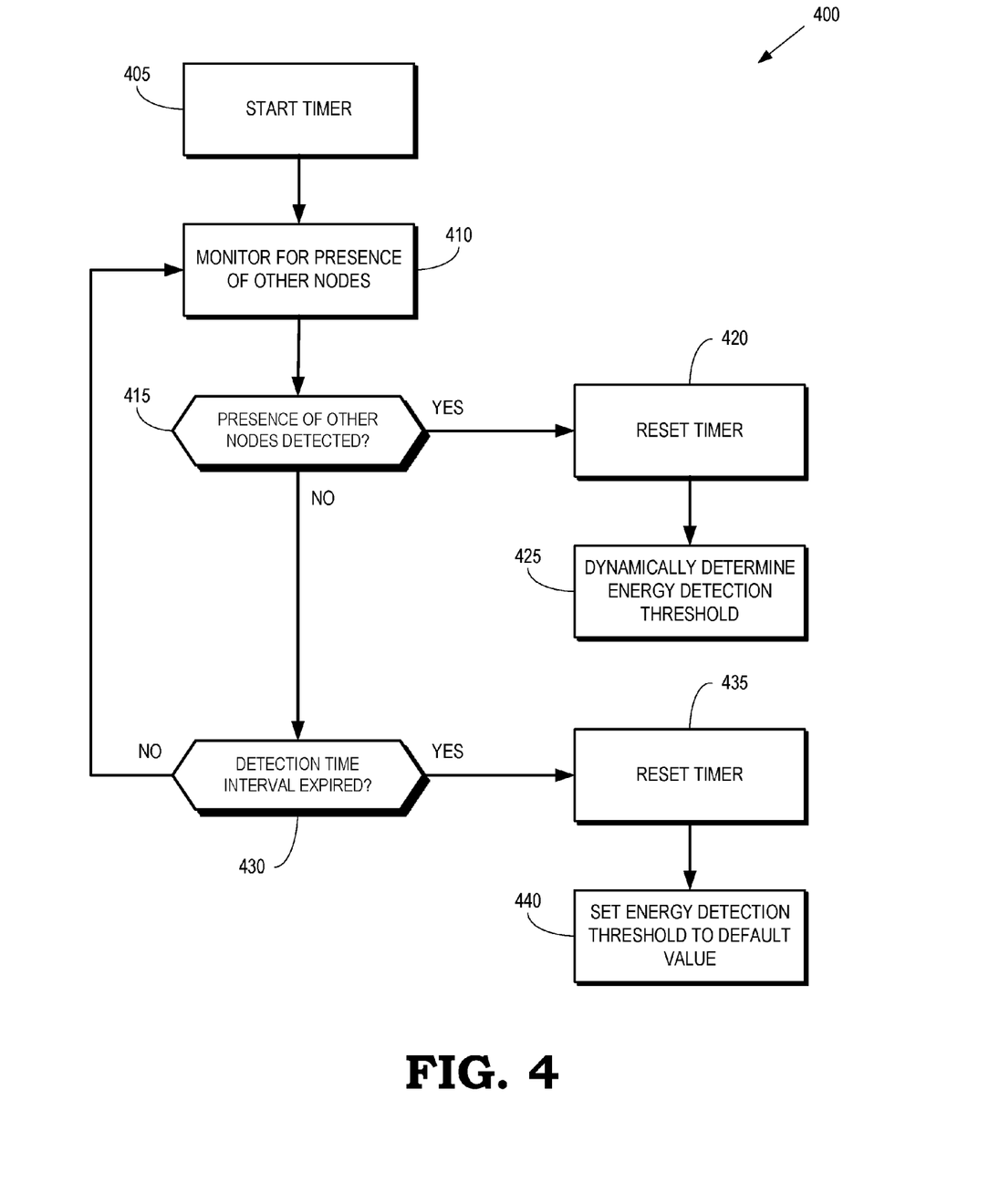
FIG. 4 is a flow chart of a method of determining whether to use a dynamically determined energy detection threshold or a default energy detection threshold based on a timer according to some embodiments.

FIG. 4 is a flow chart of a method 400 of determining whether to use a dynamically determined energy detection threshold or a default energy detection threshold based on a timer according to some embodiments. The method 400 is implemented in a node using timers to count down, or count up, or otherwise indicate the detection time interval. For example, the method 400 may be implemented in some embodiments of the node 105, the node 110, or the node 115 using timers implemented in the corresponding processors 125, 140, 155 shown in FIG. 1. The node is assigned a default energy detection threshold, e.g., a default energy detection threshold of −62 dBm that is established by the relevant standards.

At block 405, the node starts a timer that is used to determine a duration of a detection time interval. For example, the node may start the timer in response to determining that no other nodes are present or transmitting on channels of the unlicensed frequency band used by the node. At block 410, the node monitors for the presence of other nodes. At this point, the node monitors for the presence of other nodes based on a current value of an energy detection threshold. The current value of the energy detection threshold may be equal to the default value or may have been determined dynamically according to some embodiments of the method 200 shown in FIG. 2 or the method 300 shown in FIG. 3.

At decision block 415, the node determines whether the presence of any other nodes has been detected. If so, the method 400 flows to block 420 and the node resets the timer to its initial value. At block 425, the node begins dynamically determining an energy detection threshold, e.g., according to some embodiments of the method 200 shown in FIG. 2 or the method 300 shown in FIG. 3. If the node determines that no other nodes are present, the method 400 flows to decision block 430 and the node determines whether the detection time interval has expired based on a current value of the timer. If not, the method 400 flows to block 410 and continues to monitor for the presence of other nodes. If the detection time interval has expired, the method 400 flows to block 435 and resets the timer to its initial value. At block 440, the node sets the energy detection threshold back to its default value, e.g., a default value of −62 dBm.

Figure 5:
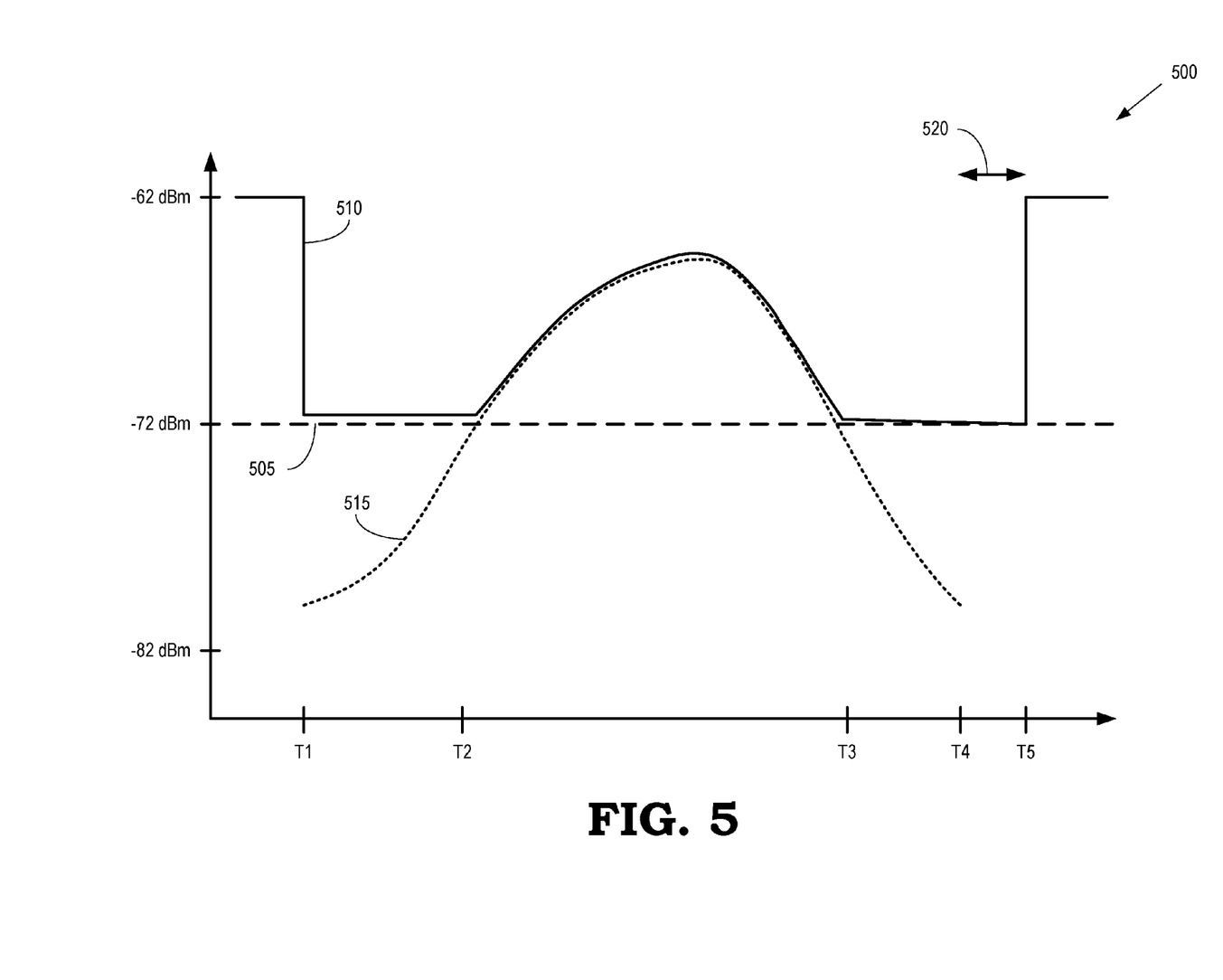
FIG. 5 is a graph illustrating variations in an energy detection threshold for a node as a function of time according to some embodiments.

FIG. 5 is a graph 500 illustrating variations in an energy detection threshold for a node as a function of time according to some embodiments. The energy detection threshold may be determined by some embodiments of the nodes 105, 110, 115 shown in FIG. 1. The vertical axis of the graph 500 indicates a received signal strength or value of an energy detection threshold in units of dBm. The horizontal axis of the graph 500 indicates time in arbitrary units increasing from left to right. The node is configured to use a default energy detection threshold of −62 dBm and a minimum energy detection threshold of −72 dBm (indicated by the dashed line representing minimum energy detection threshold 505) for performing clear channel assessment on a channel of an unlicensed frequency band. However, some embodiments of the node use different values for the default energy detection threshold or the minimum energy detection threshold 505. The node may implement some embodiments of the method 200 shown in FIG. 2, the method 300 shown in FIG. 3, or the method 400 shown in FIG. 4 to modify its energy detection threshold in response to detecting other nodes that transmit signals on the channel of the unlicensed frequency band.

At T<T1, the node has not detected any other nodes that are transmitting on the channel of the unlicensed frequency band. The node therefore maintains its energy detection threshold (indicated by the solid line representing energy detection threshold 510) at the default energy detection threshold value of −62 dBm.

At T1<T<T2, the node detects one or more other nodes that are transmitting on the channel of the unlicensed frequency band. The node determines a minimum received signal strength (indicated by the dotted line representing minimum received signal strength 515) for the other nodes. As discussed herein, the minimum received signal strength 515 may be an instantaneous measured value or may be filtered, smoothest, or averaged over a smoothing time interval. The minimum received signal strength 515 is less than the minimum energy detection threshold 505. The node therefore modifies its energy detection threshold 510 by setting the energy detection threshold 510 equal to the minimum energy detection threshold 505. The values of the energy detection threshold 510 and the minimum energy detection threshold 505 are shown as offset from each other in the interest of clarity. However, in some embodiments, the node may set the value of the energy detection threshold 510 to the value of the minimum energy detection threshold 05 plus or minus an offset value.

At T2<T<T3, the node detects one or more other nodes that are transmitting on the channel of the unlicensed frequency band. The node determines that the minimum received signal strength 515 for the other nodes is greater than the minimum energy detection threshold 505 and less than the default energy detection threshold. The node therefore modifies its energy detection threshold 510 by setting the energy detection threshold 510 equal to the minimum received signal strength 515. The value of the energy detection threshold 510 tracks the changes in the value of the minimum received signal strength 515 as long as the value of the minimum received signal strength 515 is larger than the minimum energy detection threshold 505. The values of the energy detection threshold 510 and the minimum received signal strength 515 are shown as offset from each other in the interest of clarity. However, in some embodiments, the node may set the value of the energy detection threshold 510 to the value of the minimum received signal strength 515 plus or minus an offset value.

At T3<T<T4, the node detects one or more other nodes that are transmitting on the channel of the unlicensed frequency band at a minimum received signal strength 515 that is less than the minimum energy detection threshold 505. The node therefore modifies its energy detection threshold 510 by setting the energy detection threshold 510 equal to the minimum energy detection threshold 505.

At T=T4, the node does not detect any other nodes that are transmitting on the channel of the unlicensed frequency band. The node initiates a timer that is used to measure a duration of a detection time interval 520 in response to failure of the node to detect any other nodes.

At T=T5, the node determines that the timer has expired or otherwise reached a value that indicates that the detection time interval 520 has elapsed. The node has not detected the presence of any other nodes during the detection time interval 520. The node therefore modifies the energy detection threshold 510 by setting the value of the energy detection threshold 510 equal to the default energy detection threshold.

Figure 6:
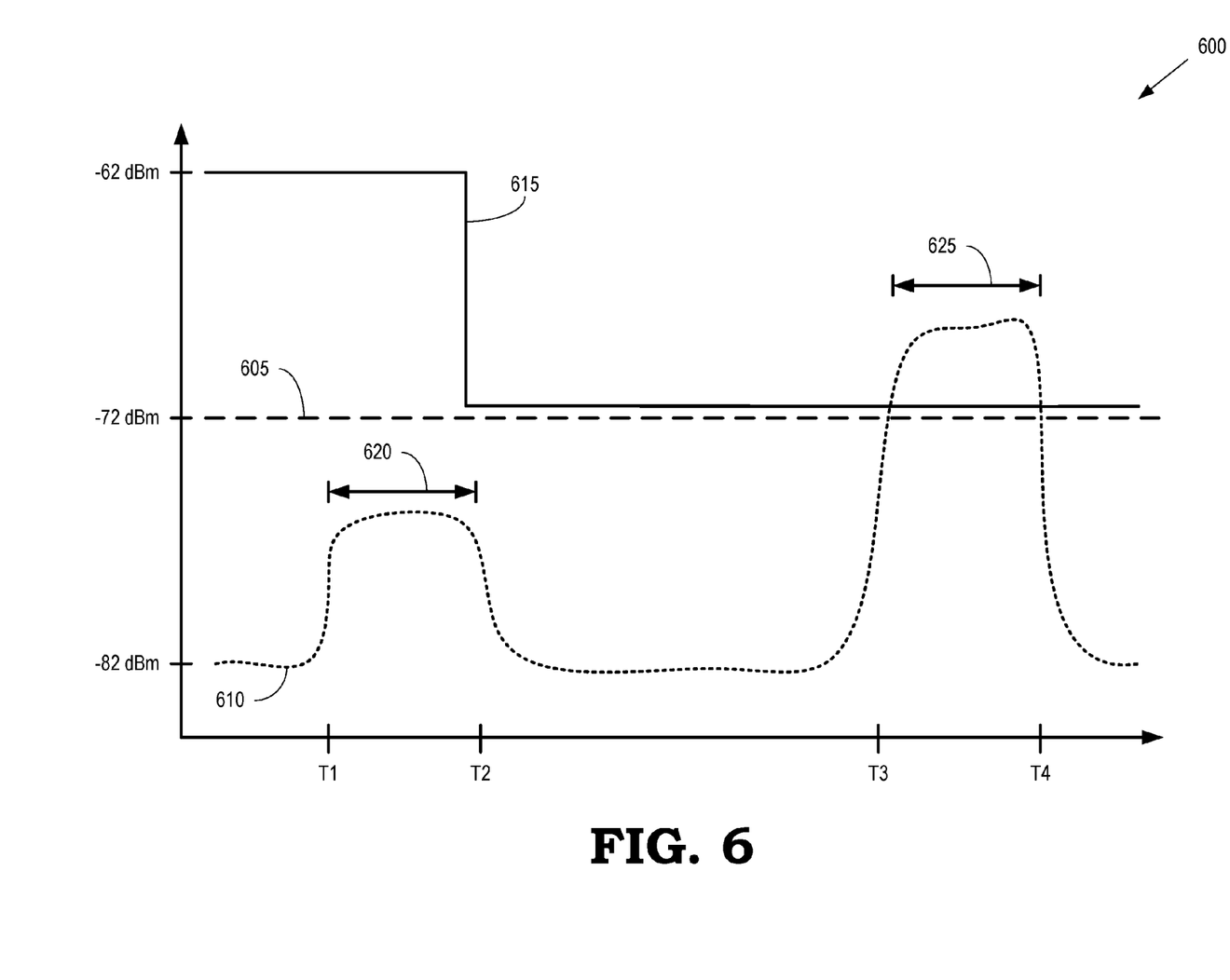
FIG. 6 is a graph illustrating detection of nodes transmitting on a channel of an unlicensed frequency band based on temporal characteristics of a signal received by a detecting node according to some embodiments.

FIG. 6 is a graph 600 illustrating detection of nodes transmitting on a channel of an unlicensed frequency band based on temporal characteristics of a signal received by a detecting node according to some embodiments. Detection of the nodes based on the temporal characteristics of the received signal strength may be implemented by some embodiments of the nodes 105, 110, 115 shown in FIG. 1. The vertical axis of the graph 600 indicates a received signal strength or value of an energy detection threshold in units of dBm. The horizontal axis of the graph 600 indicates time in arbitrary units increasing from left to right. The detecting node is configured to use a default energy detection threshold of −62 dBm and a minimum energy detection threshold of −72 dBm (indicated by the dashed line 605) for performing clear channel assessment on a channel of an unlicensed frequency band. However, other embodiments of the detecting node may use different values for the default energy detection threshold or the minimum energy detection threshold 605. The detecting node may implement some embodiments of the method 200 shown in FIG. 2, the method 300 shown in FIG. 3, or the method 400 shown in FIG. 4 to modify its energy detection threshold in response to detecting other nodes that transmit signals on the channel of the unlicensed frequency band.

At T<T1, the detecting node is receiving signals at a received signal strength 610 that is less than the default energy detection threshold or the minimum energy detection threshold. The detecting node does not detect (or is unable to decode) any preambles or other information that may be communicated by the detected signals. The detecting node therefore maintains its energy detection threshold (indicated by the line representing energy detection threshold 615) at the default energy detection threshold.

At T=T1, the detecting node detects an increase in the received signal strength 610. However, the detecting node does not detect (or is unable to detect) any preambles or other information conveyed by the detected signal. The detecting node therefore maintains its energy detection threshold 615 at the default energy detection threshold.

At T=T2, the detecting node detects a decrease in the received signal strength 610. The detecting node also determines that the received signal strength 610 has remained substantially constant at the elevated received signal strength 610 for a time interval 620. The detecting node determines that the time interval 620 corresponds to a time interval for transmission on the channel of the unlicensed frequency band. For example, other nodes that operate according to LBT rules may be permitted to transmit on the channel of the unlicensed frequency band for a time interval of 4 ms or 10 ms. In response to determining that the time interval 620 corresponds to a transmission time interval on the channel of the unlicensed frequency band, the detecting node determines that it has detected the presence of a second node transmitting on the channel of the unlicensed frequency band. The received signal strength 610 corresponding to the transmission by the second node during the time interval 620 is less than the minimum energy detection threshold 605). The detecting node therefore modifies the value of the energy detection threshold 615 to be equal to (or offset from) the minimum energy detection threshold 605.

At T=T3, the detecting node detects an increase in the received signal strength 610. However, the detecting node does not detect (or is unable to detect) any preambles or other information conveyed by the detected signal. The detecting node therefore maintains its energy detection threshold 615 at the minimum energy detection threshold 605. In the illustrated embodiment, the duration of the time interval from T2 to T3 is less than the detection time interval that indicates whether the energy detection threshold 615 should be reset to the default value of −62 dBm.

At T=T4, the detecting node detects a decrease in the received signal strength 610. The detecting node also determines that the received signal strength 610 has remained substantially constant at the elevated received signal strength 610 for a time interval 625. The detecting node determines that the time interval 625 corresponds to a time interval for transmission on the channel of the unlicensed frequency band, e.g., a time interval of 4 ms or 10 ms. In response to determining that the time interval 625 corresponds to a transmission time interval on the channel of the unlicensed frequency band, the detecting node determines that it has detected the presence of a third node transmitting on the channel of the unlicensed frequency band. The received signal strength 610 corresponding to the transmission by the third node during the time interval 625 is greater than the minimum energy detection threshold 605. However, the received signal strength 610 for the third node (e.g., in the time interval 625) is larger than the received signal strength 610 for the second node (e.g., in the time interval 620). The minimum received signal strength for the second node and the third node is therefore equal to the received signal strength 610 for the second node (e.g., in the time interval 620), which is lower than the minimum energy detection threshold 605. The detecting node therefore maintains the value of the energy detection threshold 615 at the minimum energy detection threshold 605.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a network comprising at least first and second nodes, a method comprising:
    detecting, at the first node, a second node that transmits a signal on a channel of an unlicensed frequency band, the signal having a received signal strength at the first node that is below an energy detection threshold that indicates the channel is clear for transmission by the first node, wherein detecting the second node comprises detecting an increase in the received signal strength that lasts for a time interval corresponding to a transmission time interval associated with coexistence rules for the channel of the unlicensed frequency band; and
    modifying, at the first node, the energy detection threshold based on the received signal strength.

2. The method of claim 1, wherein detecting the second node comprises decoding at least one of a beacon and a pseudo-beacon transmitted by the second node.

3. The method of claim 2, further comprising:
    determining the received signal strength for the signal transmitted by the second node based on the at least one of the decoded beacon or the decoded pseudo-beacon.

4. The method of claim 1, wherein detecting the second node comprises detecting the increase in the received signal strength followed by a decrease in the received signal strength after the time interval corresponding to the transmission time interval.

5. The method of claim 1, wherein detecting the second node comprises detecting the second node based on at least one of a master information block, a system information block, and a common reference signal transmitted by the second node.

6. In a network comprising at least first and second nodes, a method comprising:
    detecting, at the first node, a second node that transmits a signal on a channel of an unlicensed frequency band, the signal having a received signal strength at the first node that is below an energy detection threshold that indicates the channel is clear for transmission by the first node; and
    modifying, at the first node, the energy detection threshold based on the received signal strength, wherein modifying the energy detection threshold comprises determining a minimum received signal strength based on the received signal strength for the signal transmitted by the second node and setting the energy detection threshold to a larger one of the minimum received signal strength and a minimum energy detection threshold.

7. The method of claim 1, further comprising:
detecting a third node based on the modified energy detection threshold.

8. The method of claim 1, wherein the first node operates according to a different radio access technology (RAT) than the second node.

9. The method of claim 1, wherein the first node is owned or operated by a different mobile network operator than the second node.

10. A first node comprising:
a transceiver configured to detect a second node that transmits a signal on a channel of an unlicensed frequency band, the signal having a received signal strength at the first node that is below an energy detection threshold that indicates the channel is clear for transmission by the first node, wherein the transceiver is configured to detect the second node by detecting an increase in the received signal strength that lasts for a time interval corresponding to a transmission time interval associated with coexistence rules for the channel of the unlicensed frequency band; and
a processor configured to modify the energy detection threshold based on the received signal strength.

11. The first node of claim 10, wherein the processor is configured to decode at least one of a beacon and a pseudo-beacon transmitted by the second node.

12. The first node of claim 11, wherein the processor is configured to determine the received signal strength for the signal transmitted by the second node based on the at least one decoded beacon or decoded pseudo-beacon.

13. The first node of claim 10, wherein the transceiver is configured to detect the second node by detecting the increase in the received signal strength followed by a decrease in the received signal strength after the time interval corresponding to the transmission time interval.

14. The first node of claim 10, wherein the transceiver is configured to detect the second node based on at least one of a master information block, a system information block, and a common reference signal transmitted by the second node.

15. A first node comprising:
a transceiver configured to detect a second node that transmits a signal on a channel of an unlicensed frequency band, the signal having a received signal strength at the first node that is below an energy detection threshold that indicates the channel is clear for transmission by the first node; and
a processor configured to modify the energy detection threshold based on the received signal strength, wherein the processor is configured to determine a minimum received signal strength based on the received signal strength for the signal transmitted by the second node and set the energy detection threshold to a larger one of the minimum received signal strength and a minimum energy detection threshold.

16. The first node of claim 10, wherein the processor is configured to detect a third node based on the modified energy detection threshold.

17. The first node of claim 10, wherein the first node operates according to a different radio access technology (RAT) than the second node.

18. The first node of claim 10, wherein the first node is owned or operated by a different mobile network operator than the second node.

19. A non-transitory computer readable medium embodying a set of executable instructions, the set of executable instructions to manipulate a processor in a first node to:
detect a second node that transmits a signal on a channel of an unlicensed frequency band, the signal having a received signal strength at the first node that is below an energy detection threshold that indicates the channel is clear for transmission by the first node, wherein the first node detects the second node by detecting an increase in the received signal strength that lasts for a time interval corresponding to a transmission time interval associated with coexistence rules for the channel of the unlicensed frequency band; and
modify the energy detection threshold based on the received signal strength.

20. A non-transitory computer readable medium embodying a set of executable instructions, the set of executable instructions to manipulate a processor in a first node to:
detect a second node that transmits a signal on a channel of an unlicensed frequency band, the signal having a received signal strength at the first node that is below an energy detection threshold that indicates the channel is clear for transmission by the first node; and
modify the energy detection threshold based on the received signal strength, wherein the processor is to determine a minimum received signal strength for the received signal strength for the signal transmitted by the second node and to set the energy detection threshold to a larger one of the minimum received signal strength and a minimum energy detection threshold.

* * * * *